UNITED STATES PATENT OFFICE.

WILLIAM METCALF PARKIN, OF PITTSBURGH, PENNSYLVANIA.

METHOD OF TREATING WATER CONTAINING SULFURIC ACID AND IRON SALTS.

1,251,564. Specification of Letters Patent. Patented Jan. 1, 1918.

No Drawing. Application filed April 5, 1916. Serial No. 89,216.

*To all whom it may concern:*

Be it known that I, WILLIAM METCALF PARKIN, a citizen of the United States, residing at Pittsburgh, in the county of Allegheny and State of Pennsylvania, have invented new and useful Improvements in Methods of Treating Water Containing Sulfuric Acid and Iron Salts, of which the following is a specification.

This invention relates to a process for treating mine water and for recovering by-products therefrom.

It is well known that water issuing from mines and particularly coal mines is a weak, but highly corrosive solution containing acid, and is detrimental to fish life as well as destructive to submerged metal work, such for example as tanks, pipes and the like. In the Pittsburgh district alone many thousands of dollars are annually lost to the government and a much greater amount to the general public on account of this stream pollution.

These mine waters generally contain considerable free sulfuric acid, together with more or less aluminum salts, which acid may be wholly or partly neutralized and the said salts rendered less troublesome by the natural alkalinity of the water of the streams whereby the iron and the aluminum hydrates are caused to precipitate, or these salts may, under other conditions, hydrolyze, setting free acid, for example when used in boilers. They also contain more or less stable salts, which need not be considered here as they are not involved in this invention.

It is the purpose of my invention to so treat these mine waters that the free acids will be neutralized and the salts of iron and aluminum will be decomposed sufficiently to cause the removal of the iron and the aluminum as well as a large part of the acid by precipitation, the alkaline substances used being stronger bases than iron. As the free acid is neutralized and some of the acid radical removed from the iron and aluminum salts, a precipitate is formed containing principally compounds of iron and aluminum and perhaps also silica, calcium, magnesium and small quantities of many other substances, but with the latter I am not concerned in this invention.

In practising the invention I introduce into a flowing current of the mine water, sufficient alkaline material for example by a mechanical feeder, to neutralize the free acid and to partly or entirely decompose the sulfates of iron and aluminum. The minimum quantity of alkaline material necessary is determined by testing the overflow from a settling tank, from time to time and supplying sufficient alkaline material so that the overflow will contain no free acid; in which case the iron precipitated will be mostly basic sulfate. By testing the precipitate the operator can determine how much alkaline material is required to produce a hydrate.

Pulverized limestone of a fineness of from about 60 to 100 mesh has been found satisfactory as a neutralizing agent. Limestone in lumps is not desirable because a film of gypsum is liable to form upon the surface and thereby suspend chemical action. Pulverized lime, dolomite, magnesite, silicate of soda, talc, serpentine, carbonate of soda, barium carbonate, etc., may be used.

The iron content can be increased by causing the acid to first act on flue dust from blast furnaces, or by the use of an alkali containing considerable iron in a finely divided form.

As iron exists, in mine waters, in both ferrous and ferric states, the reaction taking place may be indicated as follows:—

$2CaCO_3 + H_2SO_4 + FeSO_4 = Fe(OH)_2 + 2CaSO_4 + 2CO_2$ or $H_2SO_4 + 3Fe_2(SO_4)_3 + 2H_2O + 4CaCO_3 = 2[Fe_2(SO_4)_3 + Fe(OH)_3] + 4CaSO_4 + 4CO_2$, etc., neutralization being complete or partial. The formula $Fe_2(SO_4)_3 + Fe(OH)_3$ represents one of the several basic ferric sulfates which may be present in the precipitate, and other basic compounds of iron may also be present.

The mine water and the alkaline material are thoroughly mixed together by means of a suitable agitator or mixer, which causes the water and finely divided alkaline material to pass through a series of nozzles on its way to a settling tank, where the reactions are completed and the precipitate is allowed to settle.

The precipitated material is then drawn from the tank or tanks, through a bottom orifice, by means of a siphon, pump or the like, preferably to a second tank or set of tanks, in order to still further dewater the precipitates to economize in fuel before passing to a drier, if desired.

The drying process or step can be carried to the proper extent so that part or all of the mechanical water can be removed from the precipitate, which consists largely of iron compounds (ferrous or ferric hydroxid and basic sulfates), mixed somewhat with other substances, suitable for various purposes. The precipitate will contain iron hydroxite in the gel state containing some mechanical water, or a basic ferric sulfate or a thoroughly dried hydrate or the result may be a ferric oxid according to the quantity of heat used, it being understood that the temperatures are not to be very high. For example the heat in some cases may be only to such a temperature that it will only cause evaporation while in other cases it may reach about 338 degrees C. Any sulfuric acid radical present as a basic sulfate will be separated from the hydrate before reaching this temperature. The acid will be volatilized by the heat between 179 degrees and 338 degrees C. depending upon how it is combined with the other elements present. The water of constitution of the hydrate is lost at about 300 degrees C.

A very fine quality of ferric oxid of bright color may be produced by this method which will require no grinding. If however the precipitates are calcined at much higher temperatures, the color is not so bright nor would the pigment be so fine. As a result the product would require more or less grinding and it would not have the covering power of a pigment made according to my method.

The equations representing the chemical changes taking place in the drier in which ferric oxid is produced are approximately as follows:—

1st. 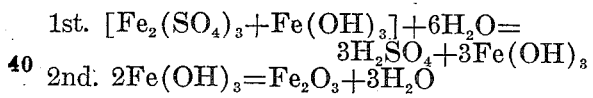
$$[Fe_2(SO_4)_3 + Fe(OH)_3] + 6H_2O = 3H_2SO_4 + 3Fe(OH)_3$$

2nd. $2Fe(OH)_3 = Fe_2O_3 + 3H_2O$

If desired the ferric oxid may be bolted to remove any coarse particles that may have been detached from the kiln or the oxid may be washed with an alkaline water to remove traces of acid.

While this invention relates primarily to acid water from coal mines it is not intended to limit the invention to the particular application enumerated because the process is susceptible to other uses, for example it is adapted to the treatment of waters from metal mines and to certain kinds of manufacturing wastes.

What I claim is:

1. A method of treating mine waters and other like waters containing iron salts and free acid, which comprises adding finely divided calcium carbonate material thereto, in amount sufficient to neutralize all the free acid and to react with at least the major portion of the iron salts, whereby a precipitate is formed, thereafter separating the precipitate from the remaining liquid and subjecting such precipitate to a temperature of between 179° C. and 338° C., whereby it is converted into a finely divided pigment without undergoing any grinding operation.

2. A method of treating mine waters and other waste liquors containing ferrous and ferric sulfates and free sulfuric acid which comprises adding thereto an amount of pulverized limestone sufficient to neutralize all the free acid and to react with at least the major portion of the iron sulfates present and to produce a precipitate containing basic iron sulfates which are insoluble, separating said precipitate from the remaining liquor and heating the same to a temperature of between 179° C. and 338° C., substantially as and for the purpose described.

In testimony whereof I affix my signature in presence of two witnesses.

WILLIAM METCALF PARKIN.

Witnesses:
B. F. FUNK,
S. SELLERS.